US006727824B1

(12) United States Patent
Miseli et al.

(10) Patent No.: US 6,727,824 B1
(45) Date of Patent: Apr. 27, 2004

(54) METHOD AND APPARATUS FOR THERMAL MANAGEMENT OF A DISPLAY

(75) Inventors: Joe Miseli, San Bruno, CA (US); Tom Fussy, Portola Valley, CA (US); Clayton Castle, Redwood City, CA (US); John Rahn, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 13 days.

(21) Appl. No.: 10/095,667

(22) Filed: Mar. 11, 2002

(51) Int. Cl.[7] .............................................. G08B 21/00
(52) U.S. Cl. ................ 340/689; 340/686.2; 340/686.3; 340/691.1; 340/691.6; 340/693.9; 340/671; 340/584; 200/61.52; 200/61.45 R; 200/524
(58) Field of Search ............................... 340/689, 686.1, 340/686.2, 686.3, 691.1, 691.6, 693.9, 671, 584; 200/61.52, 61.45 R, 52 A

(56) References Cited

U.S. PATENT DOCUMENTS 5,602,566 A * 2/1997 Motosyuku et al. ........ 345/684
6,378,830 B1 * 4/2002 Lu ........................... 248/278.1
6,515,856 B2 * 2/2003 Hidesawa ................... 361/687
6,535,225 B1 * 3/2003 Shintaku et al. ............ 345/690

OTHER PUBLICATIONS

"Flat Out Cool", *Time*, vol. 159, No. 2, Cover Photo, Jan. 14, 2002.
J. Quittner, "Apple's New Core", *Time*, vol. 159, No. 2, pp. 46–52, Jan. 14, 2002.

* cited by examiner

*Primary Examiner*—Daniel J. Wu
*Assistant Examiner*—Tai T. Nguyen
(74) *Attorney, Agent, or Firm*—O'Melveny & Myers LLP

(57) ABSTRACT

Apparatus and method are disclosed for thermally managing a display. A display may be tiltably coupled to a base, and the display may have a tilt sensor disposed therein for providing a tilt output when the display is tilted beyond a tilt threshold. Further aspects include a temperature sensors disposed for providing a high- or low-temperature threshold output when the display the exceeds predetermined temperature thresholds. The disclosure provides for producing a warning signal to the user when sensed signals are positive, and for producing a sleep signal to protect the display from thermal damage.

20 Claims, 4 Drawing Sheets

METHOD AND APPARATUS FOR THERMAL MANAGEMENT OF A DISPLAY

BACKGROUND

1. Field of the Disclosure

The disclosure relates generally to the thermal management of displays such as computer monitors.

2. The Prior Art

BACKGROUND

Proper thermal cooling is one important factor that effects the operational lifetime of computer displays. In particular, liquid crystal displays (LCDs) can be adversely effected by operational temperatures that exceed safe levels.

As LCD displays have become more sophisticated and less expensive, their use is becoming more common. As LCD displays become more sophisticated, they are also becoming thinner, and thus traditional cooling methods such as fans are undesirable.

BRIEF DESCRIPTION OF THE DRAWING FIGURES

DETAILED DESCRIPTION

Figure 1:
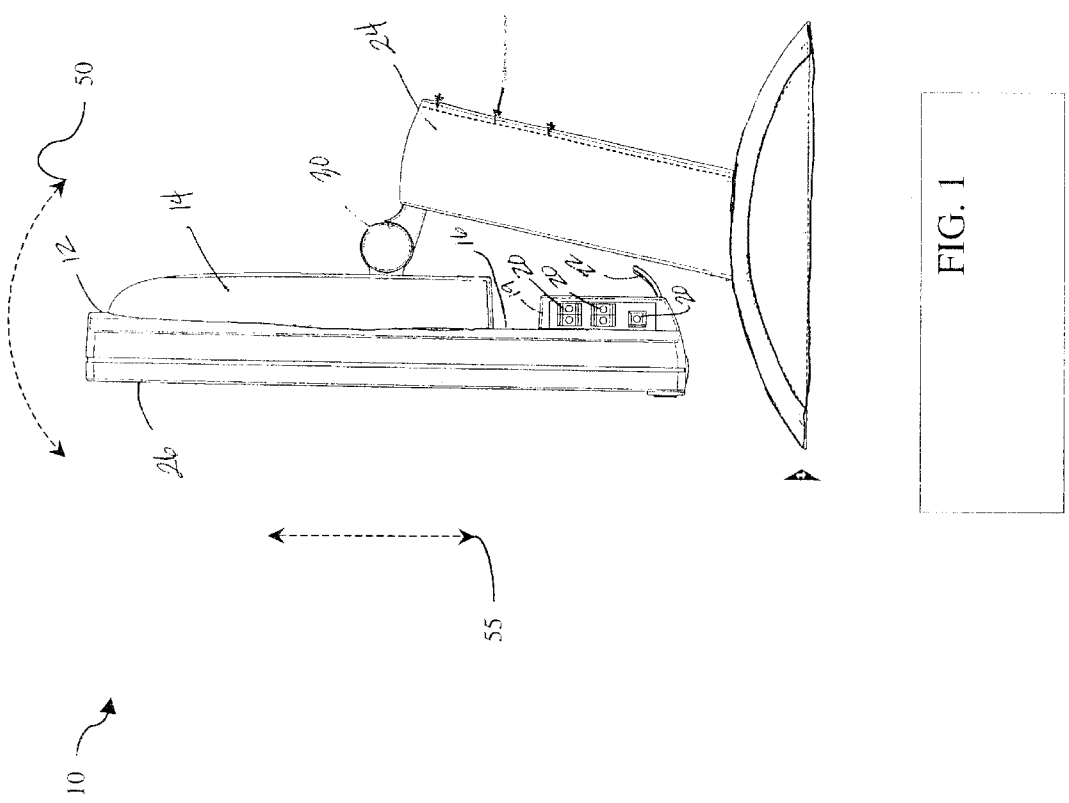
FIG. 1 is a side view of a LCD display suitable for use with this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications or processing. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Exemplary embodiments of disclosed apparatus and methods may be disclosed herein. The word "exemplary" is used exclusively herein to mean "serving as an example, instance, or illustration." Any embodiment described as an "exemplary embodiment" is not to be construed as necessarily preferred or advantageous over other embodiments described herein.

FIG. 1 is side view of a display 10 suitable for use with this disclosure. For illustrative purposes, the display 10 is shown as being an LCD screen, though other types of displays may be used in this disclosure, such as CRT-based displays or plasma-based displays. It is contemplated that any display that needs to be thermally cooled may be used in this disclosure.

The display 10 has a front surface 26 and a rear surface 12. Disposed on rear surface 12 is an upper planar surface 14. Disposed on lower planar surface 16 is raised surface 19 having at least one connector 20, such as a USB hub. Also disposed on lower planar surface 16 are a plurality of releasably connectable retaining members 22 for cable management. As seen from FIG. 1, the retaining members 22 may be hook shaped to hold a variety cables from any of the above mentioned electric cable portals 28 or USB portals 20.

The display 10 also includes an arched support member 24 coupled to the rear of the LCD screen 12 through a rotatable member 30. The member 30 may comprise a dual hinge such as that disclosed in co-pending application Ser. No. 10/097,239, filed Mar. 11, 2002, which is assigned to the same assignee of this application and is hereby incorporated by reference as though fully set forth herein.

The member 30 is preferably configured to provide two independent degrees of freedom 50 and 55 for the display 10. The member 30 may provide a first degree of freedom 50, which allows the screen disposed in the front surface 26 to be tilted at least −10° towards the viewer, when measured as referenced to the vertical. The member 30 is also preferably configured to allow the front surface 26 to tilted approximately 90° away from the vertical, bringing the screen to a horizontal position.

The member 30 is also preferably configured to provide a second degree of freedom 55, allowing the screen to be raised and lowered.

Figure 2:
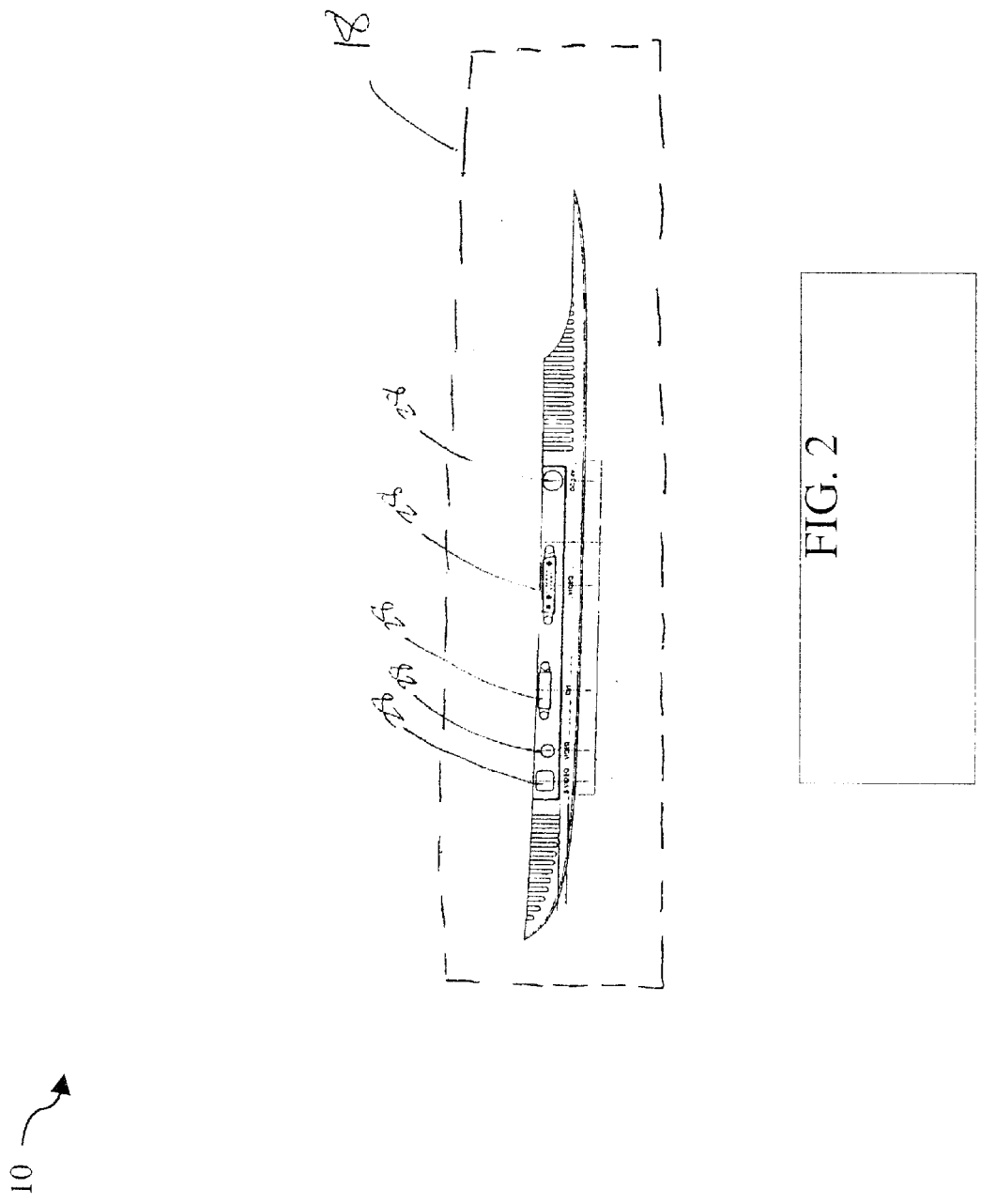
FIG. 2 is a bottom view of a LCD display suitable for use with this disclosure.

FIG. 2 is an illustration showing a bottom surface 18 of the upper planar surface 14 from FIG. 1. Disposed on bottom surface 18 are at least one connector 28 providing coupling for various types of cables and/or connectors. As will be appreciated from FIGS. 1 and 2, the connectors 28 are disposed in such a way that they are downwardly facing. Upper planar surface 14 is disposed on approximately the upper two-thirds of rear surface 12 of the LCD screen. Thus, the connectors 28 are located slightly below the center of rear surface 12 and can be easily accessed by the user when the display is rotated such that the screen is in a substantially horizontal position. When the screen is horizontal, the connectors 28 disposed about the bottom surface 18 are facing the user, allowing for easy access by the user. When the user is finished connecting the desired cables, the screen may then be flipped back to a substantially vertical position for viewing and use.

As will be appreciated by those of ordinary skill in the art, when the display in a substantially vertical position, such as in normal use, thermal cooling may be accomplished through air cooling methods known in the art. However, when the screen is rotated to a substantially horizontal position, such as when the user is connecting cable to the bottom surface 18, such cooling methods may not function properly as there is little or no path for cooling streams of air to flow across the screen and draw away heat. Thus, the screen maybe in danger of overheating when left in a position that deviates substantially from the horizontal operating position.

Thus, it is desired to provide a thermal management system whereby it is determined whether the screen has been titled. If the screen has been titled, the screen may be put into a low-power, and thus low-heat, sleep mode. Alternatively, it is desired to provide a fail-safe thermal management system whereby the screen is placed into the sleep mode if the temperature of the screen exceeds a predetermined temperature.

Figure 3:
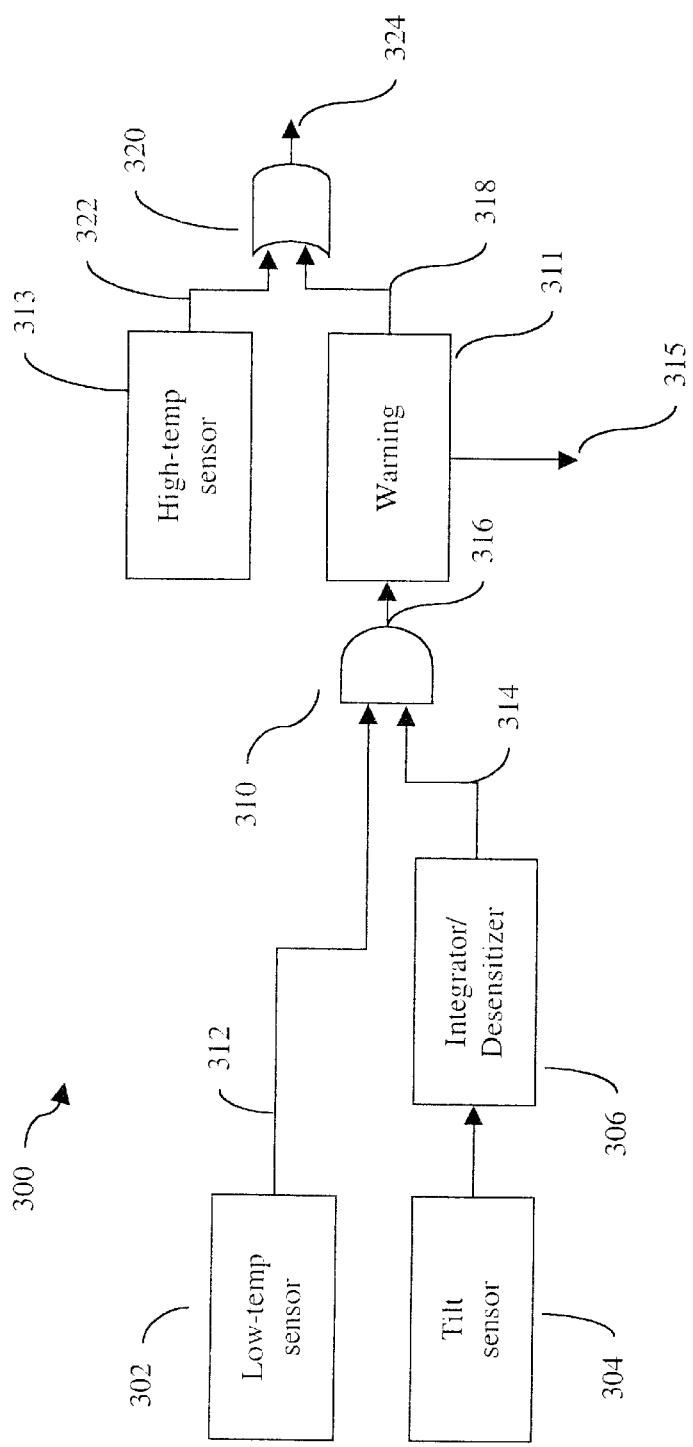
FIG. 3 is a block diagram of a thermal management system configured in accordance with the teachings of this disclosure.

FIG. 3 is a block diagram of a thermal management system 300 configured in accordance with the teachings of this disclosure. The system 300 is preferably implemented using hardware and software that is disposed within the display 10.

The system 300 includes circuitry 310 configured to perform a logical AND function as is known in the art. The logic circuitry 310 is configured to receive at least two inputs, a low temperature signal 312 and a tilt signal 314. The low temperature signal 312 is generated by a temperature sensor 302 configured to determine when the temperature of the display reaches a first threshold.

Additionally, the AND circuitry 310 receives a tilt signal 314 that is generated when the display has been titled a predetermined angle. The tilt sensor 304 may comprise any sensor suitable for providing an output responsive to the angle of the display. Such sensors may comprise mechanical or electronic sensors known in the art.

As is known by those or ordinary skill in the art, conventional mechanical tilt sensors may be erratic or unstable in their readings. Hence, an integrator and/or a desensitizing circuit 306 may be employed to process the tilt signal and provide more consistent determinations. The integration or desensitizing functions may also be performed using software, or a combination of hardware and software.

The tilt signal 314 is preferably configured to provide a positive indication to the logic circuitry 310 when the screen has been tilted 30° away from the vertical position.

When the logic circuitry 310 receives true indications on both the low-temperature input 312 and the tilt input 314, a warning signal 316 will be generated and received by warning circuitry 311. When the warning signal 316 is received by the warning circuitry 311, a warning, or nuisance, message 315 may be generated on the screen to warn the user that the screen is heating up because it is in a substantially horizontal position. Additionally, a timer may be started that will initiate a tilt timeout signal 318 if the screen is returned to a substantially vertical position. The warning message 315 may indicate the time remaining before a shutdown or sleep state is initiated.

To provide a fail-safe shutdown aspect, a high-temperature sensor 313 may be employed. The high-temperature sensor 313 is configured to ensure that the temperature of the screen does not exceed a predetermined threshold beyond which damage may result. The high-temperature sensor 313 may comprise the same type of sensor as low-sensor 302, but is configured to provide a high-temperature signal 322 when a higher threshold is exceed. Additionally, both sensors may actually comprise a single sensor containing multiple thresholds.

Both the high-temperature signal 322 and the tilt timeout signal 318 are provided to a logical OR circuitry 320. The logical OR circuitry 320 may comprise circuitry as is known in the art for performing a logical OR operation on a plurality of inputs. As a result of the logical OR operation, if either the high-temperature signal 322 or the tilt timeout signal 318 are positive, a sleep signal 324 will be provided to the appropriate display control circuitry such that the screen is immediately placed in a low-power or sleep state, thereby lowering the temperature of the device.

Figure 4:
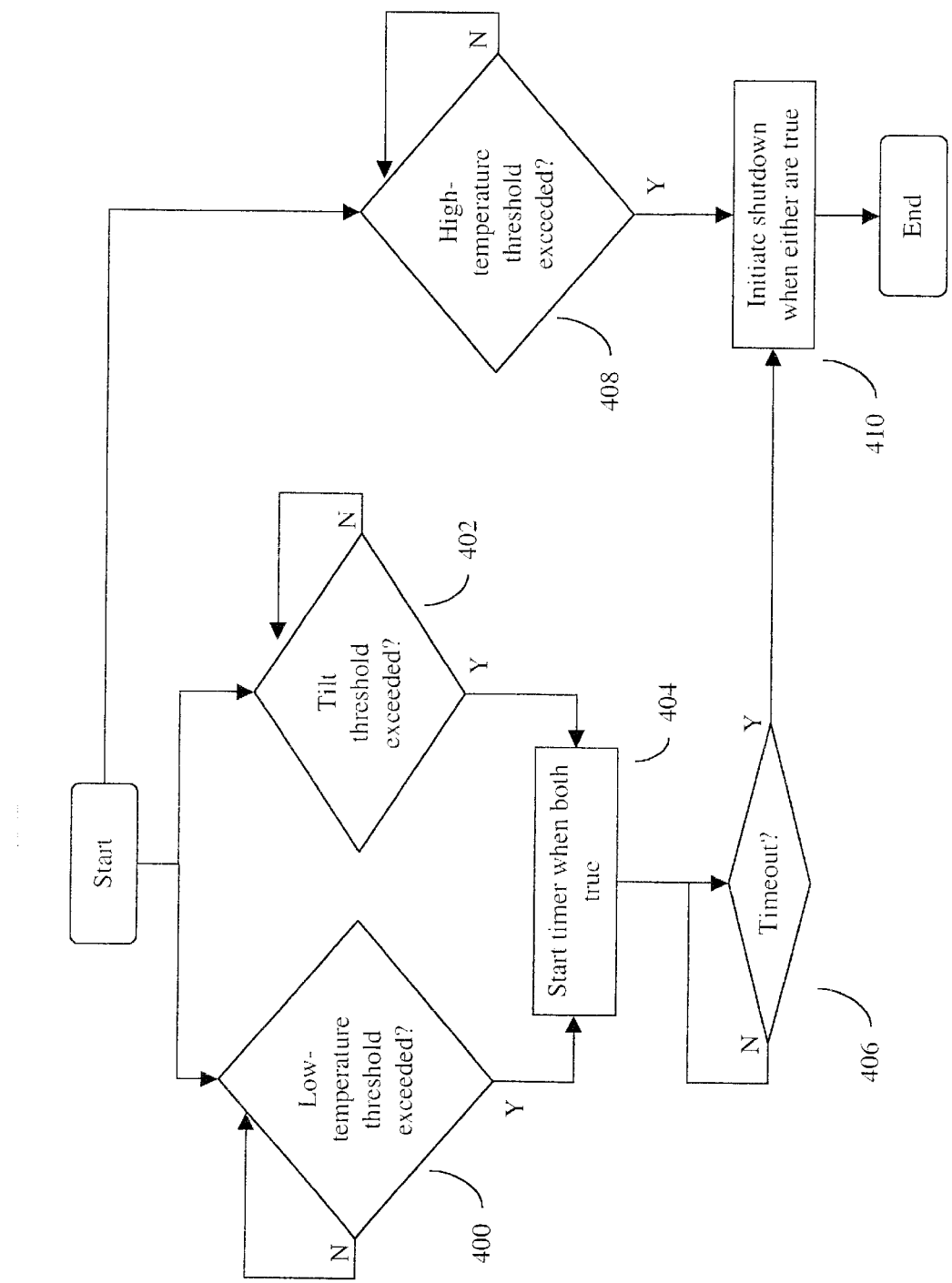
FIG. 4 is a flow diagram of a thermal management system configured in accordance with the teachings of this disclosure.

FIG. 4 is a flow diagram of a method of thermal management of a display in accordance with the teachings of this disclosure. It is contemplated that the process disclosed in FIG. 4 may be performed by the structure disclosed herein, but it is to be understood that the process of FIG. 4 may be performed by a wide variety of hardware or software depending on the particular application requirements.

The algorithm of FIG. 4 begins with multiple acts occurring relatively simultaneously. Each will be described separately. In query 400, it is determined whether a low-temperature threshold has been exceeded. If the low-temperature threshold has not been exceeded, the process may loop in act 400. When the low-temperature threshold has been exceeded, the process may move to act 404.

Relatively simultaneously, in query 402, it is determined whether a tilt threshold has been exceeded. If the tilt threshold has not been exceeded, the process may loop in query 402. When the tilt threshold has been exceeded, the process may move to act 404.

In act 404, when both the low-temperature and tilt thresholds have been exceeded, a timer may be started. The process then moves to query 406 where the process loops until a timeout has occurred. During the process of query 406, the determination is still being made as to whether the low-temperature threshold is being exceeded and as to whether the tilt threshold is still being exceeded. If the result of either query 400 or 402 goes negative, then query 406 may be abandoned and the process returns to queries 400 and 402.

It is contemplated that a warning may be provided to the user at many points in the process of FIG. 4. For example, the warning may be provided immediately after the tilt sensor has been activated. Additionally, the warning may be provided only after the query 406 has expired, in which case a separate timer may be employed to give the user a chance to respond to the warning. In a further aspect, no warning may be provided, with the display being put into a sleep state as soon as the desired criteria are detected.

If the query 406 does timeout, then the process will move to act 410, where a low power mode, such as a sleep state, will be initiated.

As a fail-safe contingency, query 408 may be active in which a high-temperature threshold is sensed. If the high-temperature threshold is not exceed, the process of query 408 will loop. When the high-temperature threshold is exceeded, the process will move to act 410, where a low power mode, such as a sleep state, will be initiated.

It is to be understood that a wide variety of embodiments may be implement using the methods and apparatus disclosed. For example, if a very accurate tilt sensor is used, the temperature sensors may not be necessary, with the thermal management being controlled solely by the tilt sensor. The low or high temperature sensors may also be employed interchangeably with the tilt sensor depending on where they are disposed within the display. For example, if a temperature sensor is disposed near very near the major heatgenerating components, the high temperature sensor may not be as critical. Alternatively, if a temperature sensor cannot be disposed proximate to a major source of heat, then the high temperature sensor may be desired to provide fail-safe protection.

Thus the actual implementation and choice of sensors and warnings may depend on the desired application, and factors such as the cost.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An apparatus for managing a display comprising:
   a display;
   a first temperature sensor disposed within said display and configured to provide a low-temperature threshold output when said display exceeds a low-temperature threshold;
   a tilt sensor disposed in said display and configured to provide a tilt output when said display is tilted beyond a tilt threshold;
   a logical AND circuit configured to receive said low-temperature threshold signal and said tilt threshold signal and produce a warning signal when both said signals are positive;
   a second temperature sensor disposed within said display and configured to provide a high-temperature threshold output when said display exceeds a high-temperature threshold; and
   a logical OR circuit configured to receive said high-temperature threshold signal and said warning signal and produce a sleep signal when either of said high-temperature threshold or said warning signals is positive.

2. The apparatus of claim 1, wherein said logical AND circuit is further configured to provide a warning message to a user prior to providing said warning signal.

3. The apparatus of claim 2, wherein said logical AND circuit is further configured to wait a predetermined amount of time after providing said warning message prior to providing said warning signal.

4. An apparatus for thermally managing a tiltable display comprising:
   a display tiltably coupled to a base;
   a tilt sensor disposed in said display and configured to provide a tilt output when said display is tilted beyond a tilt threshold;
   a first temperature sensor disposed within said display configured to provide a low-temperature threshold output when display exceeds a low-temperature threshold; and
   a logical AND circuit configured to receive said low-temperature threshold signal and said tilt threshold signal and produce a warning signal when both said signals are positive.

5. The apparatus of claim 4, further comprising:
   a second temperature sensor disposed within said display and configured to provide a high-temperature threshold output when said display exceeds a high-temperature threshold; and
   a logical OR circuit configured to receive said high-temperature threshold signal and said warning signal and produce a sleep signal when either of said high-temperature threshold or said warning signals is positive.

6. The apparatus of claim 5, wherein said logical AND circuit is further configured to provide a warning message to a user prior to providing said warning signal.

7. The apparatus of claim 6, wherein said logical AND circuit is further configured to wait a predetermined amount of time after providing said warning message prior to providing said warning signal.

8. An apparatus for thermally managing a display comprising:
   display means;
   first temperature sensor means disposed within said display providing a low-temperature threshold output when said display exceeds a low-temperature threshold;
   tilt sensor means disposed in said display for providing a title output when said display is tilted beyond a tilt threshold;
   first circuit means for receiving said low-temperature threshold signal and said tilt threshold signal and producing a warning signal when both said signals are positive;
   second temperature sensor means disposed within said display for providing a high-temperature threshold output when said display exceeds a high-temperature threshold; and
   second circuit means for receiving said high-temperature threshold signal and said warning signal and producing a sleep signal when either of said high-temperature threshold or said warning signals is positive.

9. The apparatus of claim 8, wherein said second circuit means is further configured to provide a warning message to a user prior to providing said warning signal.

10. The apparatus of claim 9, wherein said second circuit means is further configured to wait a predetermined amount of time after providing said warning message prior to providing said warning signal.

11. An apparatus for thermally managing a tiltable display comprising:
    display means tiltably coupled to a base;
    tilt sensor means disposed in said display providing a tilt output when said display is tilted beyond a tilt threshold;
    first temperature sensor means disposed within said display providing a low-temperature threshold output when said display exceeds a low-temperature threshold; and
    first circuit means for receiving said low-temperature threshold signal and said tilt threshold signal and producing a warning signal when both said signals are positive.

12. The apparatus of claim 11, further comprising:
    second temperature sensor means disposed within said display for providing a high-temperature threshold output when said display exceeds a high-temperature threshold; and
    second circuit means for receiving said high-temperature threshold signal and said warning signal and producing a sleep signal when either of said high-temperature threshold or said warning signals is positive.

13. The apparatus of claim 12, wherein said logical AND circuit is further configured to provide a warning message to a user prior to providing said warning signal.

14. The apparatus of claim 13, wherein said logical AND circuit is further configured to wait a predetermined amount of time after providing said warning message prior to providing said warning signal.

15. A method of thermally managing a tiltable display comprising:

providing a display means tiltably coupled to a base;

sensing the tilt angle of said display means;

providing a tilt output when said display means is tilted beyond a tilt threshold;

sensing a first temperature within said display and providing a low-temperature threshold output when said display exceeds a low-temperature threshold; and producing a warning signal when both said low-temperature threshold signal and said tilt threshold signals are positive.

16. The method of claim 15, further comprising:

sensing a second temperature within said display means and providing a high-temperature threshold output when said display exceeds a high-temperature threshold; and producing a sleep signal when either of said high-temperature threshold or said warning signals is positive.

17. The method of claim 16, further including the act of providing a warning message to a user prior to providing said warning signal.

18. The method of claim 17, further including the act of waiting a predetermined amount of time after providing said warning message prior to providing said warning signal.

19. An apparatus for thermally managing a tiltable display comprising:

a tilt sensor disposed in said tiltable display and configured to provide a tilt output when said tiltable display is tilted beyond a tilt threshold;

a first temperature sensor disposed within said tiltable display configured to provide a low-temperature threshold output when said tiltable display exceeds a low-temperature threshold; and a logical AND circuit configured to receive said low-temperature threshold signal and said tilt threshold signal and produce a warning signal when both said signals are positive.

20. A method of thermally managing a tiltable display comprising:

sensing the tilt angle of said tiltable display;

providing a tilt output when said tiltable display is tilted beyond a tilt threshold;

sensing a first temperature within said tiltable display and providing a low-temperature threshold output when said tiltable display exceeds a low-temperature threshold; and producing a warning signal when both said low-temperature threshold signal and said tilt threshold signals are positive.

* * * * *